(12) United States Patent
Hollingsworth

(10) Patent No.: US 12,447,424 B2
(45) Date of Patent: Oct. 21, 2025

(54) AUTOMATIC SELF-CLEANING BACKWASH STRAINER

(71) Applicant: The Hellen Strainer Company, Cleveland, OH (US)

(72) Inventor: James L. Hollingsworth, Strongsville, OH (US)

(73) Assignee: The Hellen Strainer Company, Cleveland, OH (US)

( * ) Notice: Subject to any disclaimer, the term of this patent is extended or adjusted under 35 U.S.C. 154(b) by 0 days.

(21) Appl. No.: 17/811,730

(22) Filed: Jul. 11, 2022

(65) Prior Publication Data

US 2024/0009600 A1 Jan. 11, 2024

(51) Int. Cl.
*B01D 33/50* (2006.01)
*B01D 33/11* (2006.01)

(52) U.S. Cl.
CPC ............ *B01D 33/503* (2013.01); *B01D 33/11* (2013.01)

(58) Field of Classification Search
CPC .... B01D 33/503; B01D 33/067; B01D 33/11; B01D 33/073; B01D 35/15; B01D 33/00; B01D 33/27; C02F 2103/008
See application file for complete search history.

(56) References Cited

U.S. PATENT DOCUMENTS

| | | | |
|---|---|---|---|
| 3,318,452 A * | 5/1967 | Adams | B01D 29/668 210/411 |
| 4,042,506 A | 8/1977 | Wilson | |
| 4,702,845 A | 10/1987 | Wykoff | |
| 5,139,670 A * | 8/1992 | Hirs | B01D 33/50 210/402 |
| 5,312,544 A | 5/1994 | Kinney | |
| RE35,560 E | 7/1997 | Simonelli et al. | |
| 5,851,087 A | 12/1998 | Berry, III | |
| 2014/0238911 A1 * | 8/2014 | Lee | B01D 29/52 210/108 |

(Continued)

FOREIGN PATENT DOCUMENTS

| | | | | |
|---|---|---|---|---|
| CN | 108325259 A | * | 7/2018 | |
| DE | 4345412 C2 | * | 11/1999 | ........... B01D 29/117 |

(Continued)

OTHER PUBLICATIONS

Chen, Ning, Zongming Yang, and Wenbin Luo. Development and Implementation of Ship BWMS. Singapore: Springer, 2021. Web. (Year: 2021).*

(Continued)

*Primary Examiner* — Magali P Slawski
*Assistant Examiner* — Marriah C G Ellington
(74) *Attorney, Agent, or Firm* — Benesch Friedlander Coplan & Aronoff LLP

(57) ABSTRACT

A strainer includes a housing having an inlet port, an outlet port, and a flow path from the inlet port to the outlet port. A strainer drum is supported for rotation in the housing. The drum has an open end arranged in the flow path to receive water flowing from the inlet port into the drum through the open end, and has a porous side wall arranged in the flow path to strain solids from water flowing outward from the drum through the porous side wall. A backwash tube has a backwash inlet located inside the drum and facing outward of the drum beside an inner surface of the porous side wall.

12 Claims, 8 Drawing Sheets

(56) References Cited

U.S. PATENT DOCUMENTS

| | | | | |
|---|---|---|---|---|
| 2015/0108071 A1* | 4/2015 | Kalhoj | ............... | B63J 4/002 |
| | | | | 210/791 |
| 2015/0343344 A1* | 12/2015 | DeWaard | ............ | B01D 33/463 |
| | | | | 210/391 |
| 2016/0263499 A1* | 9/2016 | Jang | ............ | B01D 29/33 |

FOREIGN PATENT DOCUMENTS

| | | | | | |
|---|---|---|---|---|---|
| EP | | 0005599 A1 | * 11/1979 | ............ | B01D 35/15 |
| GB | | 2595947 A | * 12/2021 | ............ | B01D 33/11 |
| WO | WO-2014132462 A1 | | * 9/2014 | ............ | B01D 33/11 |

OTHER PUBLICATIONS

Document No. WO 2014132462 A1 Translation (Year: 2014).*
Document No. CN 108325259 A Translation (Year: 2018).*
Hanke Filter. Automatic Backwash Filter for Continuous Filtration. https://www.hankefilters.com/products/self-cleaning-filters/automatic-backwash-filter.html. Accessed Dec. 6, 2024 (Year: 2022).*
DE4345412 Translation (Year: 1999).*
Hydrotech 2007 Drumfilter Manual (Year: 2007).*
DVS_product_catalog_2018 (Year: 2018).*
DVS_combifilter_CL65_2021 (Year: 2021).*
Model A Automatic Self-Cleaning Strainer brochure. https://www.spkinney.com/project/model-a-automatic-self-cleaning-strainer/.
Model AP Automatic Self-Cleaning Strainer brochure. https://www.spkinney.com/project/model-ap-automatic-self-cleaning-strainer/.

* cited by examiner

AUTOMATIC SELF-CLEANING BACKWASH STRAINER

TECHNICAL FIELD

This technology includes a strainer having a rotatable drum with a porous side wall for straining solids from water flowing through the side wall.

BACKGROUND

A supply of clean water is sometimes obtained from a source of water having entrained solids. For example, a ship or other marine structure may need a supply of clean water to be obtained from sea water. In such cases the sea water is directed to flow through a screen or sieve in the form of a rotatable drum. Solids accumulated on the drum are typically removed by backwashing or scraping the drum as it rotates.

SUMMARY

An apparatus includes a housing having an inlet port, an outlet port, and a flow path from the inlet port to the outlet port. A strainer drum is supported for rotation in the housing. The drum has an open end arranged in the flow path to receive water flowing from the inlet port into the drum through the open end. The drum further has a porous side wall arranged in the flow path to strain solids from water flowing outward from the drum through the porous side wall.

The apparatus further includes a backwash tube. The backwash tube has a backwash inlet port that is located inside the drum. The backwash inlet port faces outward of the drum beside an inner surface of the porous side wall.

In a given example, the housing further has a second inlet port and a second flow path from the second inlet port to the outlet port. The drum has a second open end arranged in the second flow path to receive water flowing from the second inlet port into the drum through the second open end of the drum.

The given example further includes a spray arm with a spray arm outlet that is located outside the drum. The spray arm outlet faces inward of the drum beside an outer surface of the porous side wall. Additionally, the spray arm outlet and the backwash inlet are located in circumferentially adjacent positions relative to the drum.

DETAILED DESCRIPTION

Figure 1:
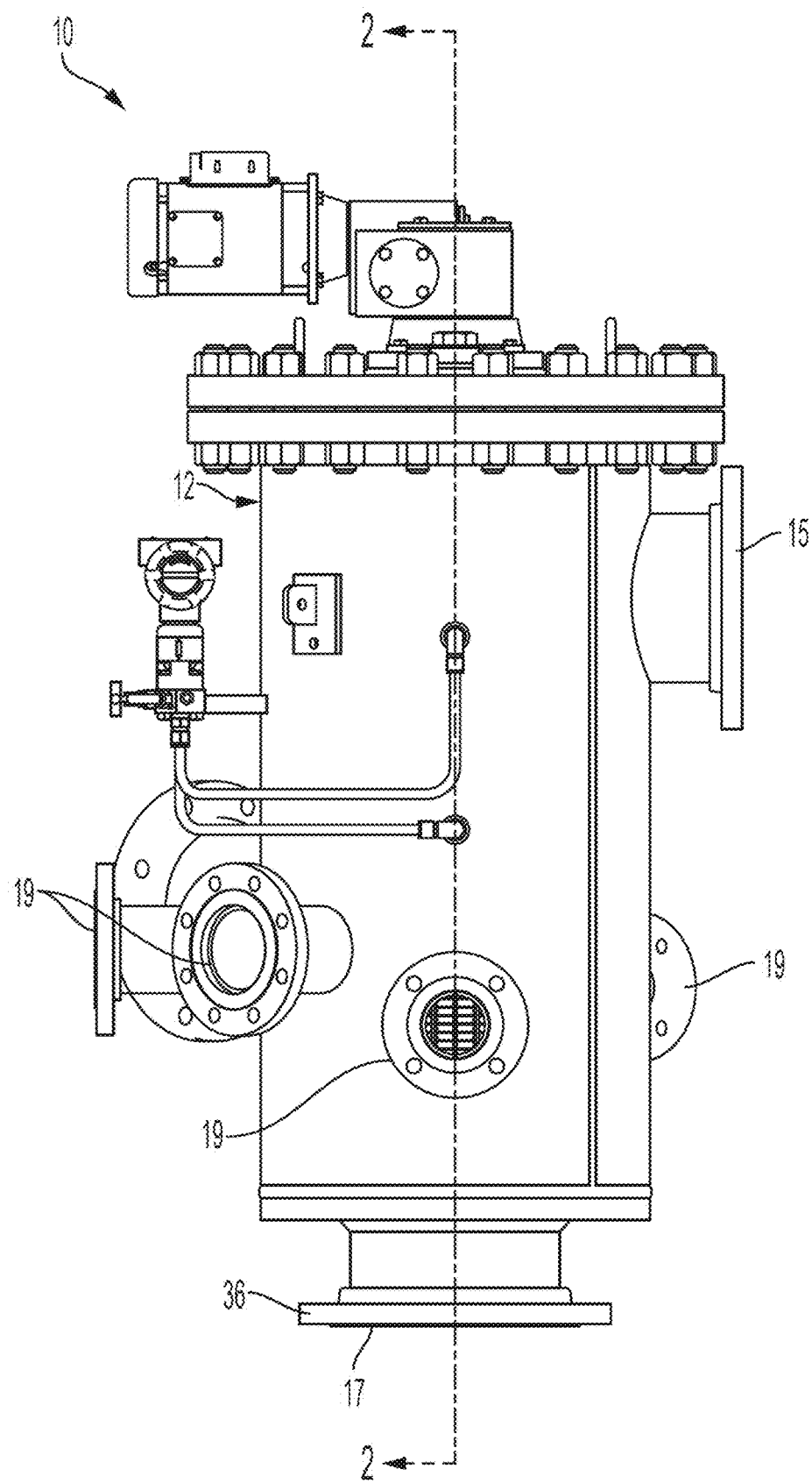
FIG. 1 is a side view of a strainer.

The apparatus shown in the drawings has parts that are examples of the elements recited in the claims. The illustrated apparatus thus includes examples of how a person of ordinary skill in the art can make and use the claimed invention. These examples provide enablement and best mode without imposing limitations that are not recited in the claims. One or more elements of one embodiment may be used in combination with, or in substitution for, one or more elements of another embodiment as needed for any particular implementation of the claimed invention.

Figure 2:
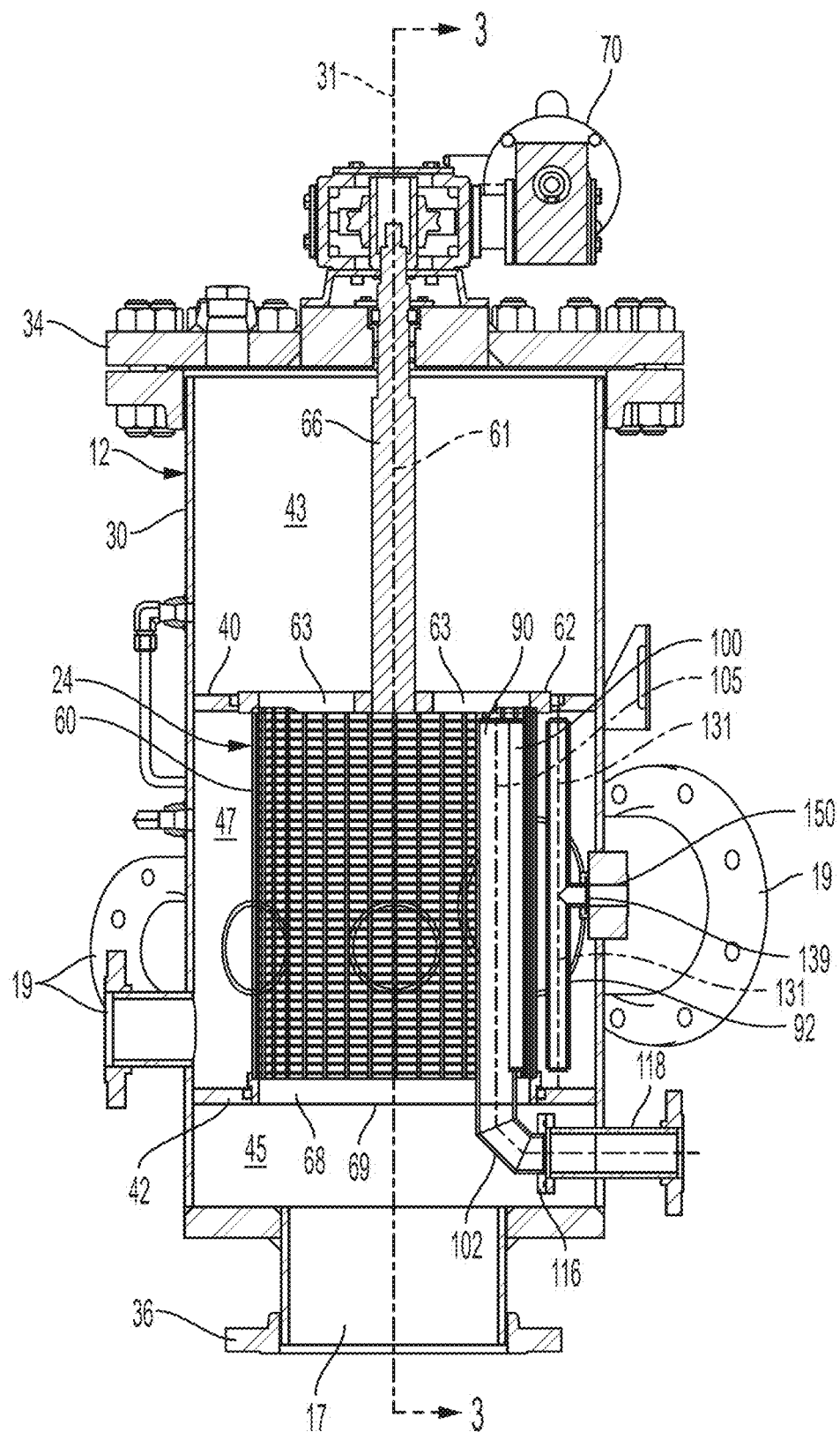
FIG. 2 is sectional view of the strainer, taken on line 2-2 of FIG. 1.
Figure 3:
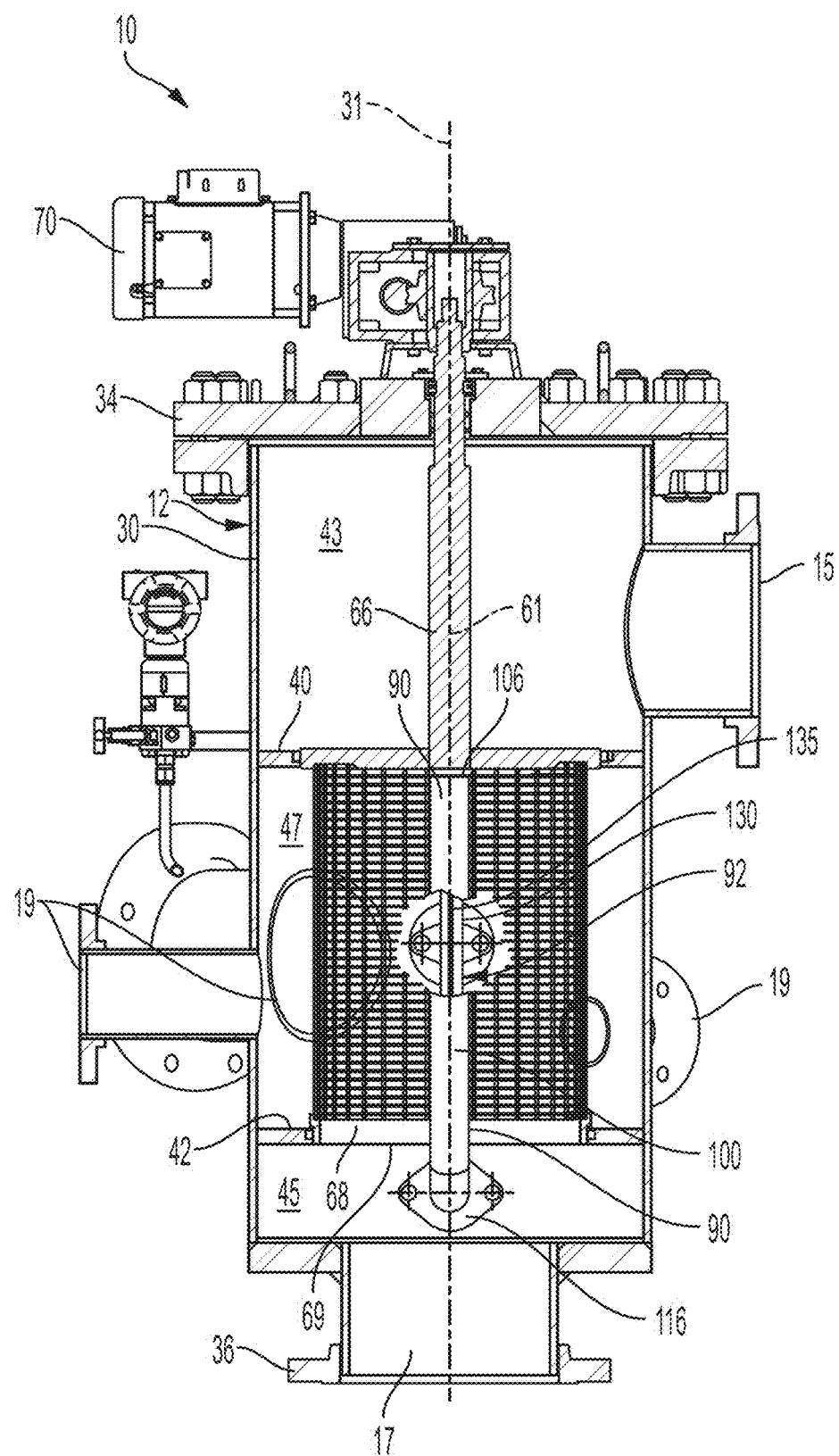
FIG. 3 is a sectional view of the strainer, taken on line 3-3 of FIG. 2.

FIGS. 1-3 show a strainer 10 for removing solids from streams of water. The strainer 10 in this example is configured to remove solids from sea water on a ship or other marine structure. As shown in FIG. 1, the strainer 10 has a housing 12 with inlet ports and outlet ports. These include an upper inlet port 15, a lower inlet port 17, and an array of outlet ports 19. A strainer drum 24 (FIGS. 2 and 3) inside the housing 12 removes solids from water flowing through the housing 12 from the inlet ports 15, 17 to the outlet ports 19.

The housing 12 has a cylindrical body wall 30 with a longitudinal central axis 31. An upper end of the body wall 30 is closed by a top wall 34 of the housing 12. The upper inlet port 15 is open through the body wall 30 near the top wall 34. The lower inlet port 17 is open through a bottom wall 36 of the housing 12 in a position centered on the axis 31. This embodiment has five outlet ports 19 in an array reaching circumferentially about the body wall 30.

As shown in FIGS. 2 and 3, the housing 12 further has an upper partition wall 40 and a lower partition wall 42. The partition walls 40 and 42 divide the inside of the housing 12 into an upper chamber 43, a lower chamber 45, and an intermediate chamber 47. The upper and lower inlet ports 15 and 17 communicate directly with the upper and lower chambers 43 and 45, respectively. The outlet ports 19 communicate directly with the intermediate chamber 47.

Figure 4:
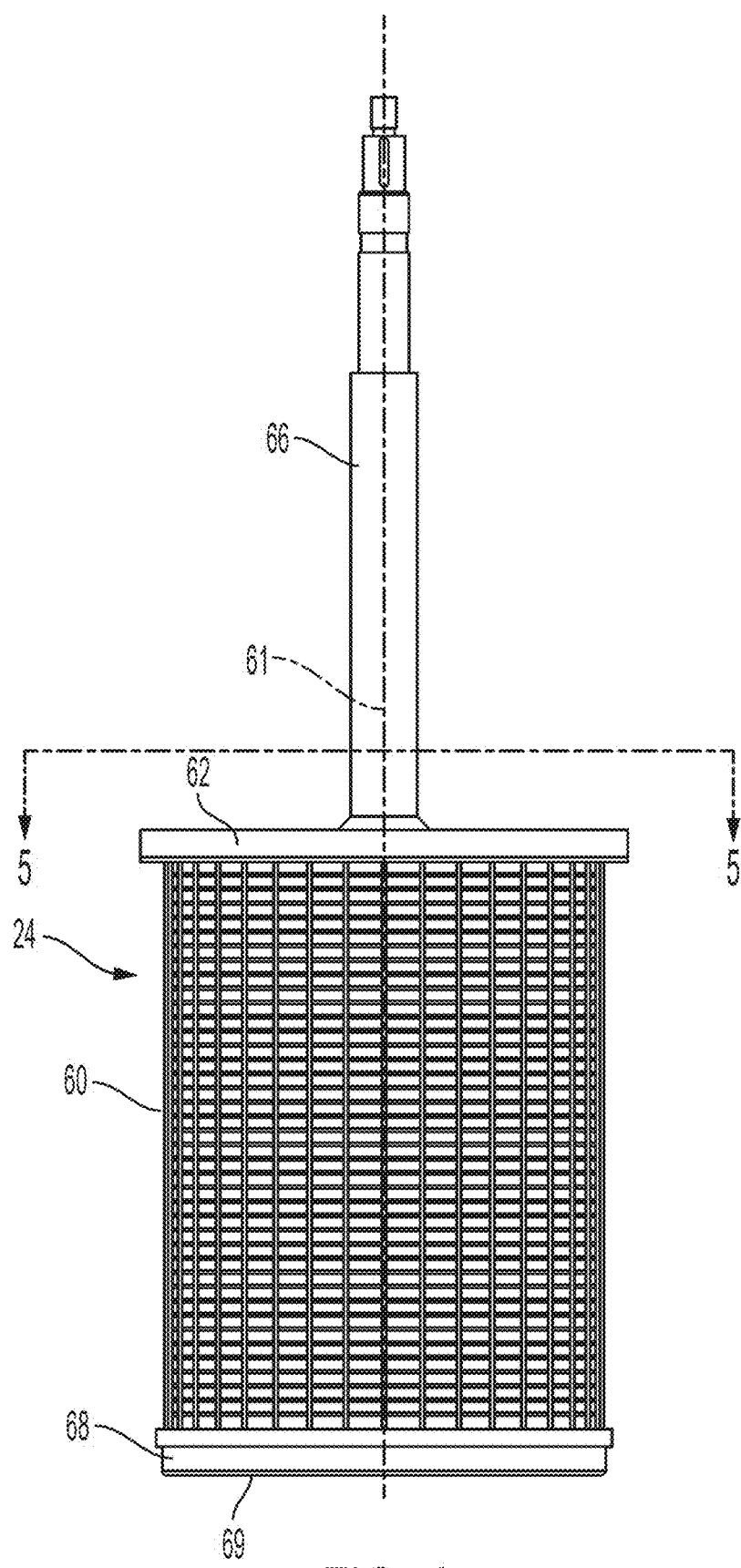
FIG. 4 is a separate side view of a strainer drum shown in FIGS. 2 and 3.
Figure 5:
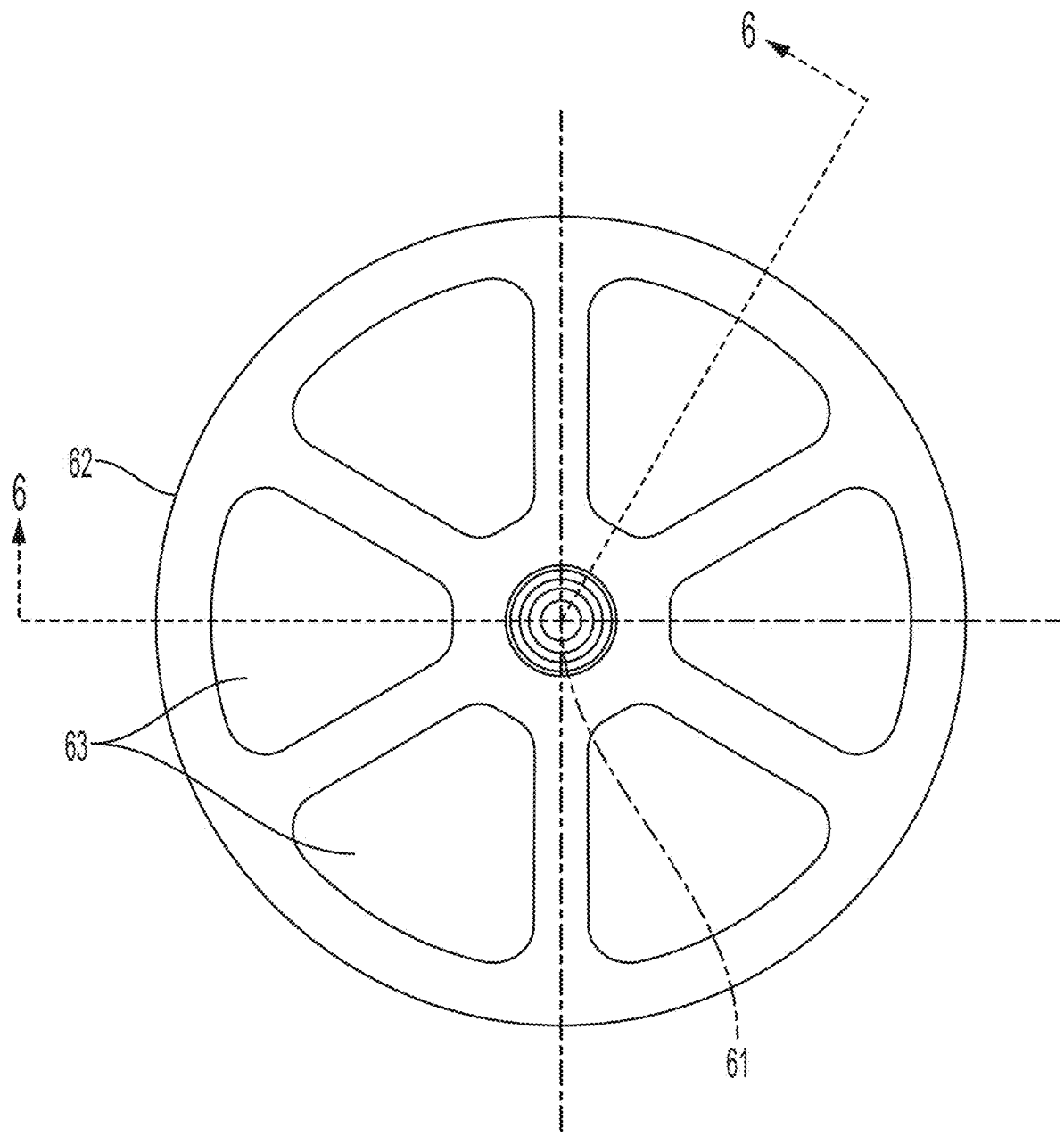
FIG. 5 is a top view of the strainer drum, taken on line 5-5 of FIG. 4.
Figure 6:
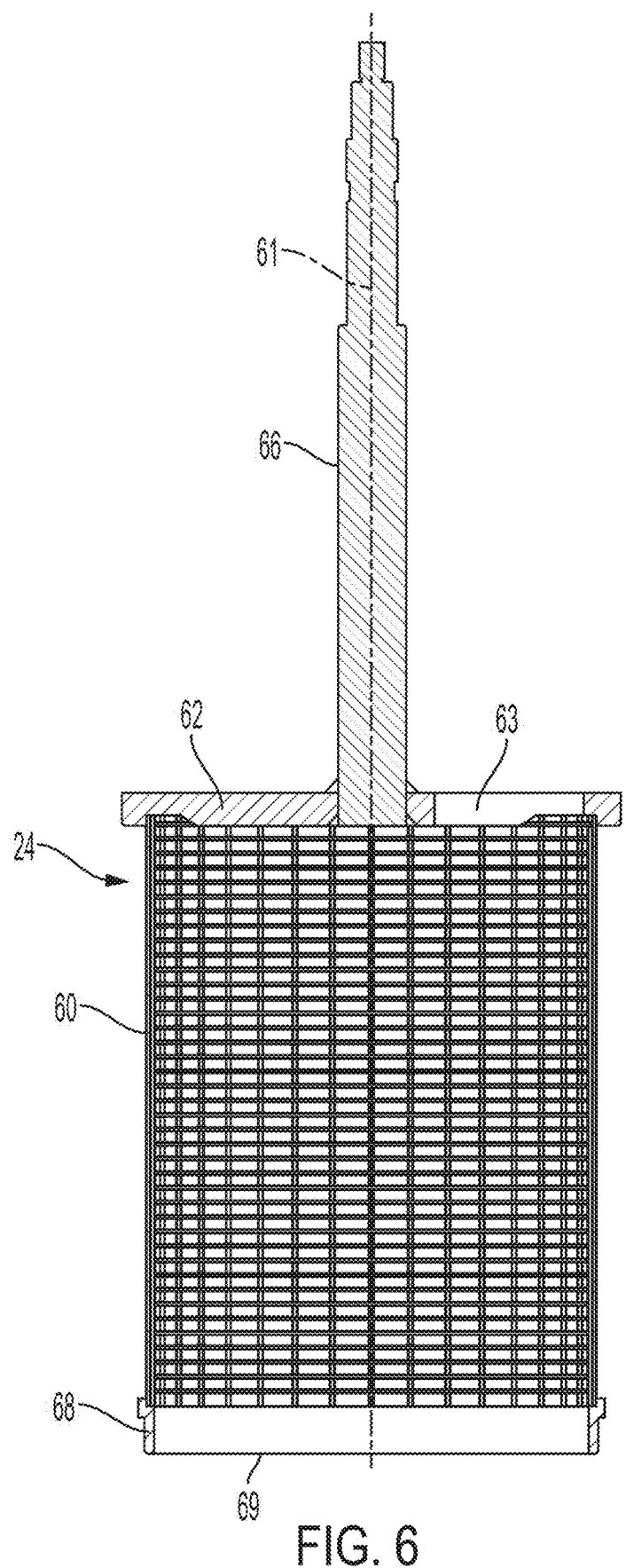
FIG. 6 is a partly section view of the strainer drum, taken on line 6-6 of FIG. 5.

As shown separately in FIG. 4, the strainer drum 24 has a cylindrical side wall 60 centered on a longitudinal axis 61. The side wall 60 is porous as needed to block the passage of solids of a predetermined size while permitting the passage of water. An end wall 62 at the top of the side wall 60 has an array of circumferentially spaced openings 63, as shown in FIG. 5. A rotational drive shaft 66 for the drum 24 projects upward from the end wall 62 along the axis 61. A circular rim 68 at the bottom of the side wall 60 defines an open lower end 69 of the drum 24.

When the drum 24 is installed in the housing 12 as shown in FIGS. 2 and 3, the side wall 60 of the drum 24 is located coaxially within the intermediate chamber 47 between the upper and lower partition walls 40 and 42. The end wall 62 at the top of the drum 24 is journaled for rotation in the upper partition wall 40. The rim 68 at the bottom of the drum 24 is journaled for rotation in the lower partition wall 42. The drive shaft 66 reaches through the top wall 34 of the housing 12 into engagement with a motor 70. In this arrangement the drum 24 is supported in the housing 12 for rotation about the axis 31 under the influence of the motor 70.

As further shown in FIG. 2, the openings 63 in the end wall 62 of the drum 24 communicate the upper chamber 43 of the housing 12 with the intermediate chamber 47. The open lower end 69 of the drum 24 communicates the lower chamber 45 with the intermediate chamber 47. This configuration defines first and second flow paths through the housing 12.

The first flow path reaches into the upper chamber 43 through the upper inlet port 15, and from the upper chamber 43 into the intermediate chamber 47 through the openings 63 in the end wall 62 of the drum 24. The first flow path thus reaches axially into the drum 24 within the side wall 60, and then reaches radially outward from the drum 24 through the side wall 60. Finally, the first flow path continues outward from the intermediate chamber 47 through one or more of the outlet ports 19.

The second flow path reaches into the lower chamber 45 through the lower inlet port 17, and axially into the drum 24 through the open lower end 69 of the drum 24. Like the first flow path, the second flow path reaches radially outward from the drum 24 through the side wall 60, and continues outward from the intermediate chamber 47 through one or more of the outlet ports 19.

Figure 9:
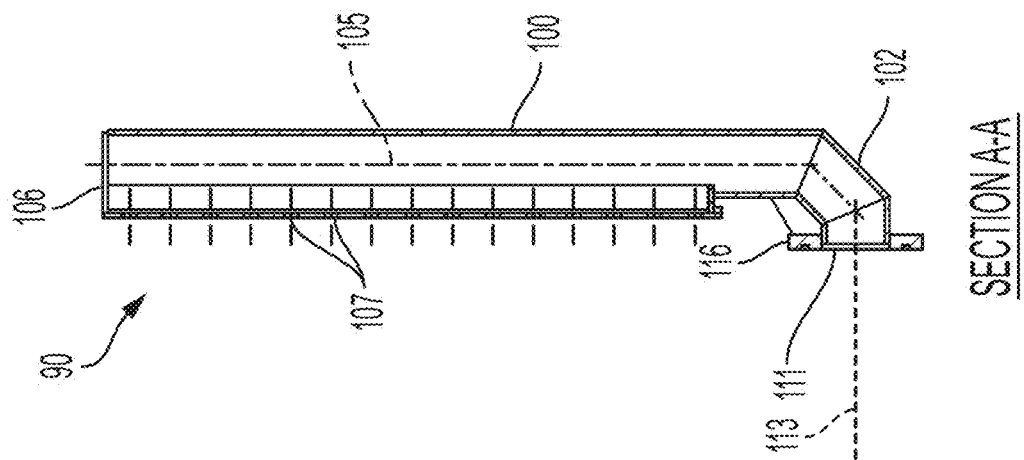
FIGS. 7-9 are side views of a backwash arm.
Figure 8:
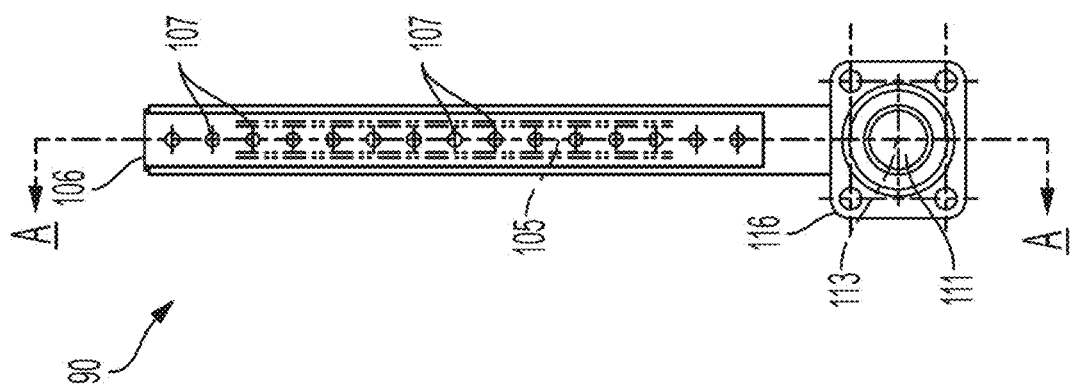
Figure 7:
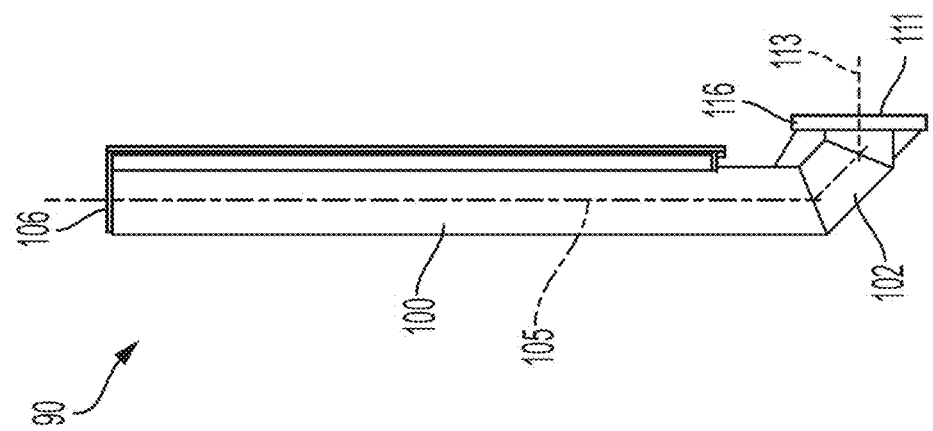
Figure 13:
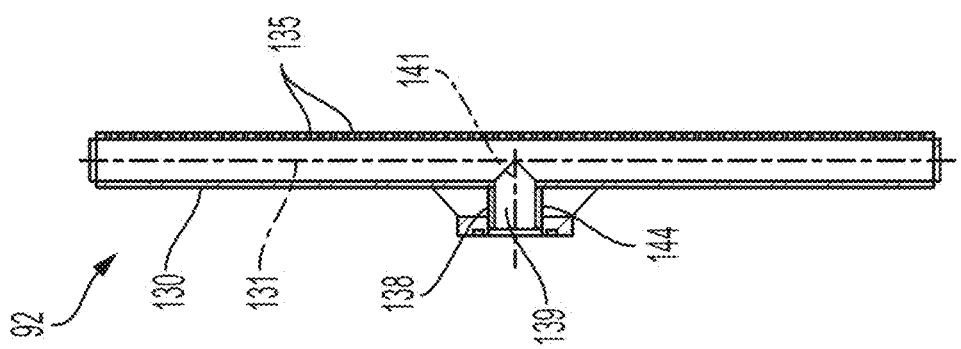
FIGS. 10-13 are side views of a spray arm.
Figure 12:
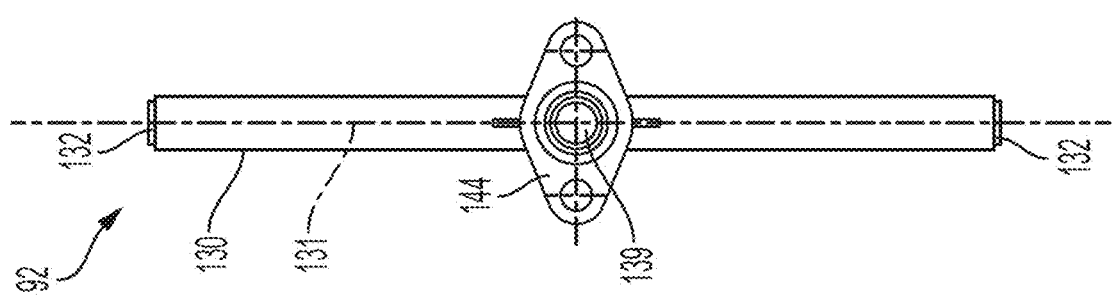
Figure 11:
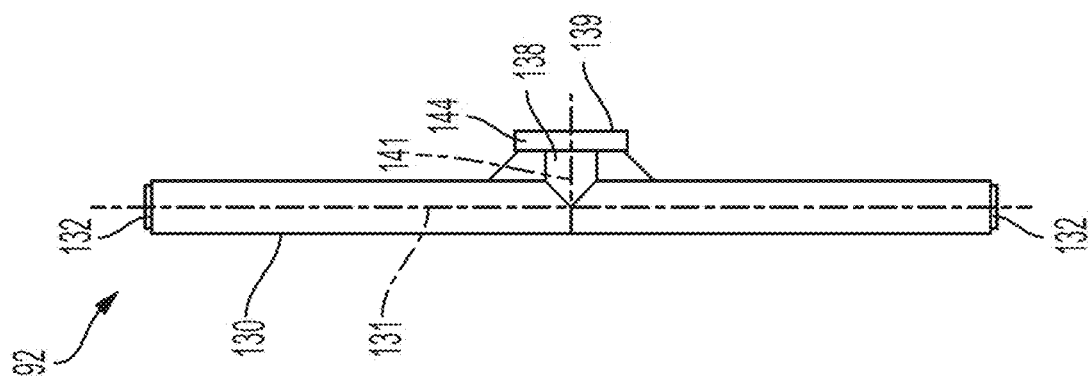
Figure 10:
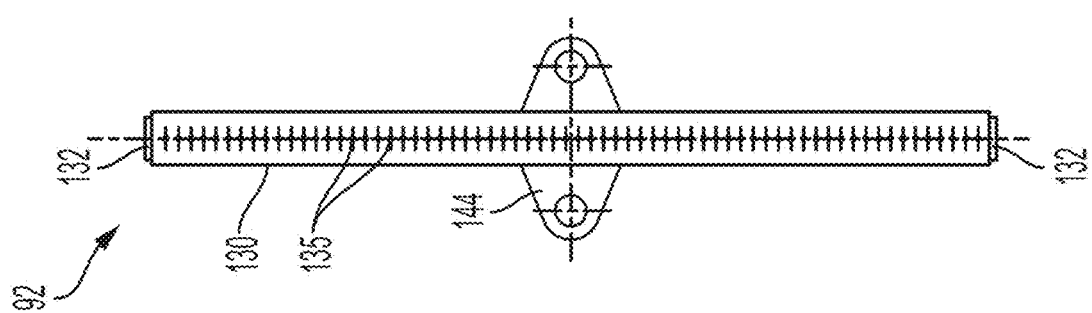

Other parts shown in FIG. 2 include a backwash arm 90 and a spray arm 92. As shown separately in FIGS. 7-9, the backwash arm 90 is a tube with an inlet section 100 and an outlet section 102. The inlet section 100 of the backwash arm 90 is centered on a longitudinal axis 105, and has a closed upper end 106. Multiple backwash inlet ports 107 (FIGS. 8 and 9) are spaced apart in a row extending axially along the inlet section 100. The outlet section 102 turns from the lower end of the inlet section 100, and has a backwash outlet port 111 centered on an axis 113 perpendicular to the axis 105. A mounting flange 116 is provided on the outlet section 102.

In the installed position shown in FIGS. 2 and 3, the backwash arm 90 is fixed to the housing such that the drum 24 is rotatable relative to both the backwash arm 90 and the housing 12. In the illustrated example the mounting flange 116 on the backwash arm 90 is fixed to a backwash outlet pipe 118 that projects outward from the housing 12. The inlet section 100 reaches upward into the screening drum 24 through the open lower end 69 of the drum 24, with the axis 105 of the inlet section 100 parallel to the axis 31 of the drum 24. The inlet ports 107 face radially outward of the drum 24 beside the inner surface of the side wall 60.

The spray arm 92 (FIGS. 10-13) is a tube with an elongated outlet section 130 centered on a longitudinal axis 131. The opposite ends 132 of the outlet section 130 are closed, and multiple outlet ports 135 are arranged in a row extending axially along its length. A shorter inlet section 138 of the spray arm 92 has an inlet port 139 centered on a transverse axis 141 perpendicular to the longitudinal axis 131. A mounting flange 144 is provided on the inlet section 138.

Referring again to FIGS. 2 and 3, the spray arm 92 is mounted on the body wall 30 of the housing 12. The inlet port 139 is connected to a water supply pipe 150 reaching through the body wall 30. The outlet section 130 of the spray arm 92 is located outside the drum 24, with the outlet ports 135 facing radially inward toward the outer surface of the side wall 60. Additionally, the axis 131 of the spray arm 92 is parallel to the axis 105 of the backwash arm 90. Their two elongated sections 100 and 130 are located in circumferentially adjacent positions relative to the drum 24 so that outlet ports 135 on the spray arm 92 face radially inward directly toward the outwardly facing inlet ports 107 on the backwash arm 90.

In operation, water is pumped to the strainer 10 through inlet supply lines, and is discharged from the strainer 10 through outlet discharge lines. Such hydraulic lines (not shown) are provided with valves configured for initiating, regulating, and terminating the flow of water in a known manner.

A straining mode of operation is initiated by directing water into the housing 12 through one or both of the inlet ports 15 and 17. A stream of water directed into the upper inlet port 15 flows along the first flow path through the upper chamber 43 and downward into the drum 24. Solids are filtered from the water as it flows radially outward from the drum 24 through the porous side wall 60 and into the intermediate chamber 47. The strained water flows further outward from the intermediate chamber 47 through one or more of the outlet ports 19. In a similar manner, a stream of water directed into the lower inlet port 17 flows along the second flow path through the lower chamber 45 and upward into the drum 24. That stream next flows radially outward from the drum 24 through the porous side wall 60 and into the intermediate chamber 47 from which the strained water flows further outward through one or more of the outlet ports 19.

In a backwash mode of operation, the motor 70 is actuated to rotate the drum 24. The backwash outlet pipe 118 is opened to the ambient atmospheric pressure to induce suction pressure in the backwash arm 90. Water is directed from the water supply pipe 150 into the spray arm 92. That water is sprayed from the outlet ports 135 radially inward through the side wall 60 of the drum 24 to dislodge solids that accumulated on the inside of the side wall 60 in the straining mode of operation. The suction pressure in the backwash arm 90 draws the sprayed water inward through the inlet ports 107 for discharge through the outlet pipe 118. Rotation of the drum 24 ensures that the entire periphery of the side wall 60 is moved between the radially opposed ports 135 and 107 for backwashing about the entire circumference of the drum 24.

This written description sets forth the best mode of carrying out the invention, and describes the invention so as to enable a person of ordinary skill in the art to make and use the invention, by presenting examples of the elements recited in the claims. The detailed descriptions of those elements do not impose limitations that are not recited in the claims.

What is claimed is:

1. An apparatus comprising:
   a housing having an exterior body wall;
   a plurality of internal partition walls disposed within the housing that divide the housing into a first chamber disposed at a first end of the housing, a second chamber disposed at an opposing second end of the housing, and an intermediate chamber disposed between the first and second chambers;
   a first inlet port defined in the exterior body wall of the housing in the first chamber;
   a second inlet port defined in the exterior body wall of the housing in the second chamber;
   a plurality of outlet ports defined in the exterior body wall of the housing in the intermediate chamber;
   a drum, wherein a single strainer drum is the only drum present in the apparatus, disposed and supported for rotation within the housing and having:
      an open first end journaled for rotation in a first partition wall dividing the first chamber from the intermediate chamber,
      an open second end, disposed opposite said first end, journaled for rotation in a second partition wall dividing the second chamber from the intermediate chamber,
      a porous cylindrical side wall extending between each of the open first end and the open second end, and
      a longitudinal central axis that is located coaxially within the intermediate chamber, the strainer drum being configured to rotate within the housing about the longitudinal central axis of the strainer drum, and to strain solids from fluid flowing from an interior of the strainer drum outward through the porous sidewall;

a first flow path defined within the housing from the first inlet port, through the open first end of the strainer drum, into an interior of the strainer drum, and outward through the porous sidewall of the strainer drum to at least one of the outlet ports in the intermediate chamber;

a second flow path defined within the housing from the second inlet port, through the open second end of the strainer drum, into an interior of the strainer drum, and outward through the porous sidewall of the strainer drum to at least one of the outlet ports in the intermediate chamber, wherein flow into the strainer drum from the first flow path and flow into the strainer drum from the second flow path are in opposite directions; and a backwash tube having an inlet section extending from the second chamber outside of the strainer drum into the interior of the strainer drum through the open second end about a longitudinal axis that is parallel to and noncolinear with respect to the longitudinal central axis of rotation of the strainer drum, and having a backwash inlet facing radially outward from the central rotational axis of the strainer drum and disposed adjacent an inner surface of the porous side wall.

2. The apparatus of claim 1, wherein the first inlet port communicates directly with the first chamber, the second inlet port communicates directly with the second chamber, and the outlet ports communicate directly with the intermediate chamber.

3. The apparatus of claim 2, wherein the porous side wall of the strainer drum is disposed in the intermediate chamber.

4. The apparatus of claim 1, wherein the backwash tube is fixed to the exterior body wall of the housing such that the strainer drum is rotatable relative to both the backwash tube and the housing.

5. The apparatus of claim 1, further comprising:
a spray arm disposed in the intermediate chamber outside of the strainer drum and adjacent to an outer surface of the porous sidewall of the strainer drum, and having a spray arm outlet facing radially inward toward the outer surface of the porous side wall of the strainer drum.

6. The apparatus of claim 5, wherein the spray arm outlet and the backwash inlet are located in circumferentially adjacent positions relative to the strainer drum.

7. An apparatus comprising:
a housing having an exterior body wall;
a plurality of internal partition walls disposed within the housing that divide the housing into a first chamber, a second chamber, and an intermediate chamber disposed between the first and second chambers;
a first inlet port defined in the exterior body wall of the housing in the first chamber;
a second inlet port defined in the exterior body wall of the housing in the second chamber;
a plurality of outlet ports defined in the exterior body wall of the housing in the intermediate chamber between the first and second inlet ports; and
a drum, wherein a single strainer drum is the only drum present in the apparatus, having:
an open first end rotatably supported in a first partition wall separating the first chamber from the intermediate chamber,
an open second end disposed opposite said first end and rotatably supported in a second partition wall separating the second chamber from the intermediate chamber,
a porous cylindrical side wall disposed in the intermediate chamber and extending between each of the open first end and the open second end, and
a longitudinal central axis that is located coaxially within the intermediate chamber, the strainer drum being configured to rotate within the housing about the longitudinal central axis of the strainer drum, and to strain solids from fluid flowing from an interior of the strainer drum outward through the porous sidewall.

8. The apparatus of claim 7, wherein the first inlet port communicates directly with the first chamber, the second inlet port communicates directly with the second chamber, and at least one of the outlet ports communicates directly with the intermediate chamber.

9. The apparatus of claim 7, further comprising:
a backwash tube having an inlet section extending from the second chamber outside of the strainer drum into the interior of the strainer drum through the open second end, about a longitudinal axis that is noncolinear with respect to the longitudinal central axis of rotation of the strainer drum, and having a backwash inlet facing radially outward from the central rotational axis of the strainer drum and disposed adjacent an inner surface of the porous side wall.

10. The apparatus of claim 9, wherein the backwash tube is fixed to the exterior body wall of the housing such that the strainer drum is rotatable relative to both the backwash tube and the housing.

11. The apparatus as defined in claim 9, further comprising:
a spray arm fixed to the exterior body wall of the housing and disposed in the intermediate chamber outside of the strainer drum and adjacent to an outer surface of the porous sidewall of the strainer drum, and having a spray arm outlet facing inward toward the outer surface of the porous side wall of the strainer drum, wherein the spray arm outlet and the backwash inlet are located in circumferentially adjacent positions relative to the strainer drum.

12. An apparatus comprising:
a housing having an exterior body wall;
a plurality of internal partition walls disposed within the housing that divide the housing into a first chamber disposed at a first end of the housing, a second chamber disposed at an opposing second end of the housing, and an intermediate chamber disposed between the first and second chambers;
a first inlet port defined in the exterior body wall of the housing in the first chamber;
a second inlet port defined in the exterior body wall of the housing in the second chamber;
a plurality of outlet ports defined in the exterior body wall of the housing in the intermediate chamber;
a drum, wherein a single strainer drum is the only drum present in the apparatus, disposed within the intermediate chamber of the housing and having:
an open first end rotatably supported in a first partition wall separating the first chamber from the intermediate chamber,
an open second end disposed opposite said first end and rotatably supported in a second partition wall separating the second chamber from the intermediate chamber,
a porous cylindrical side wall disposed in the intermediate chamber and extending between each of the open first end and the open second end, and a longitudinal central axis that is located coaxially within the intermediate chamber, the strainer drum being configured to rotate within the housing about the longitudinal central axis of the strainer drum, and to strain solids from fluid flowing from an interior of the strainer drum outward through the porous sidewall;

a first flow path defined within the housing from the first inlet port, through the open first end of the strainer drum into an interior of the strainer drum in the intermediate chamber, and outward through the porous sidewall of the strainer drum to at least one of the outlet ports in the intermediate chamber; and a second flow path defined within the housing from the second inlet port, through the open second end of the strainer drum into an interior of the strainer drum in the intermediate chamber, and outward through the porous sidewall of the strainer drum to at least one of the outlet ports in the intermediate chamber, wherein flow into the strainer drum from the first flow path and flow into the strainer drum from the second flow path are in opposite directions.

* * * * *